(12) United States Patent
Macinnis

(10) Patent No.: US 10,591,746 B2
(45) Date of Patent: Mar. 17, 2020

(54) EYEWEAR AND METHODS FOR MAKING EYEWEAR

(71) Applicant: Brent Macinnis, Ottawa (CA)

(72) Inventor: Brent Macinnis, Ottawa (CA)

(73) Assignee: Brent Macinnis, Ottawa (CA)

( * ) Notice: Subject to any disclaimer, the term of this patent is extended or adjusted under 35 U.S.C. 154(b) by 2 days.

(21) Appl. No.: 15/850,187

(22) Filed: Dec. 21, 2017

(65) Prior Publication Data

US 2019/0196220 A1 Jun. 27, 2019

(51) Int. Cl.
  *G02C 7/02* (2006.01)
(52) U.S. Cl.
  CPC ......... *G02C 7/022* (2013.01); *G02C 2202/20* (2013.01)
(58) Field of Classification Search
  CPC ..................................... G02C 7/022
  USPC .............................. 351/41, 159.01
  See application file for complete search history.

(56) References Cited

U.S. PATENT DOCUMENTS

| | | | |
|---|---|---|---|
| 9,151,891 | B2 | 10/2015 | Ma et al. |
| 9,482,796 | B2 | 11/2016 | Arbabi et al. |
| 9,658,469 | B2 | 5/2017 | Pugh et al. |
| 9,664,817 | B1 | 5/2017 | Di Falco |
| 2002/0159160 | A1 | 10/2002 | Kayanoki et al. |
| 2017/0082263 | A1 | 3/2017 | Byrnes et al. |
| 2018/0284428 | A1* | 10/2018 | Guenter .................. G02B 1/00 |
| 2019/0154877 | A1* | 5/2019 | Capasso .................. G02B 1/00 |

FOREIGN PATENT DOCUMENTS

| | | |
|---|---|---|
| CA | 2831640 | 10/2012 |
| CA | 2846645 | 9/2014 |
| WO | 2017176921 | 10/2017 |

OTHER PUBLICATIONS

Search Report and Written Opinion dated Aug. 13, 2018 for International application No. PCT/CA2017/051529.
International Search Report and Written Opinion that issued on PCT/CA2017/051570.
M. Khorasaninejad, et al., in "Visible Wavelength Planar Metalenses Based on Titanium Dioxide", IEEE Journal of Selected Topics in Quantum Electronics, vol. 23, No. 3, May/Jun. 2017.
F. Aieta, et al., "Multiwavelength achromatic metasurfaces by dispersive phase compensation", Science, vol. 347, pp. 1342-1345, 2015.

(Continued)

*Primary Examiner* — Tuyen Tra
(74) *Attorney, Agent, or Firm* — Frost Brown Todd LLC; Douglas G. Gallagher; Kevin C. Oschman

(57) ABSTRACT

Conventional eyewear devices such as spectacles typically include one or more refractive lenses. Such lenses may be thick or bulky. According to an aspect of the disclosure, a metalens-based eyewear devices is provided. The eyewear device includes one or more lenses. Each lens comprises a substantially transparent lens body. Each lens further comprises at least one metalens integrated with the body. Each metalens comprises a respective substantially transparent substrate, and a respective plurality of subwavelength structures arranged on the substrate in a pattern to interact with visible light. The lens body may be planar. The lenses of such eyewear (including at least one metalens) may be thinner and/or lighter than conventional refractive lenses.

24 Claims, 7 Drawing Sheets

(56) References Cited

OTHER PUBLICATIONS

Joseph A. Lemire et al., "Antimicrobial activity of metals: mechanisms, molecular targets and applications" Nature Reviews Microbiology, vol. II, No. 6, pp. 371-384; Jun. 13, 2013.
M. Khorasaninejad et al., "Super-Dispersive Off-Axis Meta-Lenses for Compact High Resolution Spectroscopy" Nano Lett. 2016, 16, 3732-3737.
Wei Ting Chen et al., "A broadband achromatic metalens for focusing and imaging in the visible", Nature Nanotechnology, vol. 13, pp. 220-226 (2018).
Andrea Di Falco et al., "Flexible metamaterials at visible wavelengths", 2010 New J. Phys. 12 113006.
Wang et al., "Wide-band achromatic metalens for visible light by dispersion compensation method" 2017 J. Phys. D: Appl. Phys. 50 455101.
H. Chen et al., "A review of metasurfaces: physics and applications", pp. 1-44, May 26, 2016.
C. Borkhataria, "Will your next spectacles have METAL lenses? Harvard researchers reveal radical new material that could replace glass in everything from phones to eyewear", Daily Mail, Feb. 8, 2017.
L. Burrows, "Metalens works in the visible spectrum, sees smaller than a wavelength of light", News and Events, Harvard, John A. Paulson School of Engineering and Applied Sciences, Jun. 2, 2016.

\* cited by examiner

EYEWEAR AND METHODS FOR MAKING EYEWEAR

FIELD OF THE DISCLOSURE

The present disclosure relates to eyewear including spectacles and the like. More particularly, the present disclosure relates to eyewear including one or more metalenses.

BACKGROUND

Conventional eyewear devices such as spectacles include one or more refractive eyewear lenses made of plastic or glass. The term "refractive lens" herein refers to lenses that focus or disperse light beams by means of refraction caused by the curvature and/or relative angles of surfaces of the lens. For example, concave and/or convex surfaces may be used for focusing or dispersing light The shape, size and weight of refractive lenses in conventional eyewear may be dictated or limited by the optical requirements of the lens. For example, the thickness of lenses in eyewear is typically related to the optical strength of the lenses. Such refractive lenses may pose a variety of difficulties for conventional eyewear. For example, refractive lenses may be bulky, heavy less visually appealing and/or less comfortable for a user.

SUMMARY

According to an aspect, there is provided an eyewear device comprising: an eyewear frame; at least one eyewear lens held by the eyewear frame, each at least one eyewear lens comprising: a respective substantially transparent lens body; and a respective metalens integrated with the lens body, wherein the metalens comprises a substantially transparent substrate and a plurality of subwavelength structures arranged on the substrate in a pattern to interact with visible light.

According to another aspect, there is provided an eyewear lens comprising: a substantially transparent lens body; and a metalens integrated with the lens body, wherein the metalens comprises a substantially transparent substrate and a plurality of subwavelength structures arranged on the substrate in a pattern to interact with visible light.

According to another aspect, there is provided a method for making an eyewear device comprising: providing at least one eyewear lens comprising a substantially transparent lens body and a metalens integrated with the lens body, the metalens comprising a substantially transparent substrate and a plurality of subwavelength structures arranged on the substrate in a pattern to interact with visible light; providing an eyewear frame; and mounting the at least one eyewear lens in the eyewear frame.

In some embodiments, the eyewear device comprises spectacles.

In some embodiments, the subwavelength structures comprise one of a dielectric material and a metal.

In some embodiments, for each said eyewear lens, the respective lens body comprises one of: plastic, polycarbonate, high-refractive-index polymer, and glass.

In some embodiments, the subwavelength structures comprise nanopillars.

In some embodiments, for each said eyewear lens, the respective metalens is embedded within the lens body.

In some embodiments, for each said eyewear lens, the respective lens body comprises a front and a rear surface, and the metalens is arranged on one of: the front surface and the rear surface.

In some embodiments, for each said eyewear lens, the respective substrate of the metalens is adhered to the lens body.

In some embodiments, the substrate comprises one of: a polymer and glass.

In some embodiments, the subwavelength structures of the metalens are arranged directly on the lens body, the lens body forming the substrate of the metalens.

In some embodiments, the metalens of each said at least one eyewear lens is configured to correct an eyesight condition.

In some embodiments, the lens body is a planar body.

In some embodiments, for each said at least one eyewear lens, the respective metalens comprises a plurality of metalens regions, each of the plurality of metalens regions having a respective focusing strength.

Other aspects and features of the present disclosure will become apparent to those ordinarily skilled in the art upon review of the following description of the specific embodiments.

BRIEF DESCRIPTION OF THE DRAWINGS

Aspects and embodiments of the disclosure will now be described in greater detail with reference to the accompanying diagrams, in which.

DETAILED DESCRIPTION

As mentioned above, the shape and thickness of conventional eyewear lenses may be limited or dictated by the optical requirements of the lenses. Thick eyewear lenses may be bulky, heavy, and/or uncomfortable for a wearer of the eyewear. Thus, it may be desirable to reduce the required thickness and weight of eyewear lenses. Furthermore, frames for conventional eyewear may need to be designed to accommodate refractive lenses of a variety of different thicknesses and/or curvatures because such features of the lens may vary depending on the strength and type of correction provided by the lenses.

According to an aspect, there is provided an eyewear device comprising at least one an eyewear lens held in an eyewear frame to be worn by a user. The at least one eyewear lens comprises a respective lens body and at least one respective metalens integrated with the lens body. The metalens may also be referred to as a metasurface, metalens zone, etc. According to another aspect, there is provided an eyewear lens having at least one metalens. According to another aspect, there is provided a method of making eyewear as described herein.

The eyewear device may be a pair of spectacles, glasses, a monocle, or any other similar eyewear in which an eyewear lens is held in a position within a user's line of sight when worn. The eyewear device may be for correcting an eye condition. Eyewear (e.g. spectacles) comprising at least one metalens carried in or on a lens body may be planar, thin and much lighter than conventional eyewear having refractive lenses. The lens body may comprise CR39, polycarbonate or other higher index materials, for example.

Figure 3:
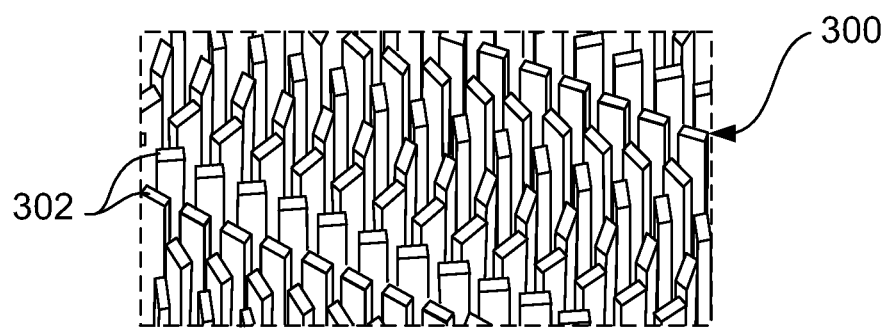
FIG. 3 is an enlarged perspective partial view of an example array of nanofins of a metalens.

A "metalens" is a lens including an array of structures on a substrate that interact with electromagnetic radiation. Specifically, the structures have dimensions that are less than the wavelength(s) of the radiation and are arranged in a pattern which alters an incoming wavefront in a non-refractive, non-diffractive manner by virtue of the composition, shape, orientation, height and diameter of the structures. Structures having such dimensions are referred to herein as "subwavelength structures". To interact with electromagnetic radiation in the visible spectrum (i.e. visible light), the subwavelength structures have dimensions such as height, width and/or spacing in the nanometer range. Thus, such structures may be referred to as nanostructures. Nanostructures may be in the form of nanopillars (e.g. nanofins) which act as sub-wavelength light phase shifters to focus or disperse light. The term "nanopillar" refers to any structure with one or more subwavelength dimensions (height, width, thickness) that extends away from the substrate. The term "nanofin" refers to a nanopillar with a generally fin-like shape. For example, nanofins may have a generally rectangular prism-like shape as shown in FIG. 3. A metalens may also be referred to as a "planar lens". A substrate with subwavelength structures thereon may be referred to as a "metasurface". Metalenses have been proposed for use in various electronic devices such as cameras, for example.

The metalens-based eyewear lenses described herein may be thinner than conventional devices. Reducing the thickness of lenses in eyewear may be advantageous. The use of metalenses in eyewear such as spectacles may allow for smaller, lighter lenses, which may improve the comfort and customizability of eyewear.

Figure 1:
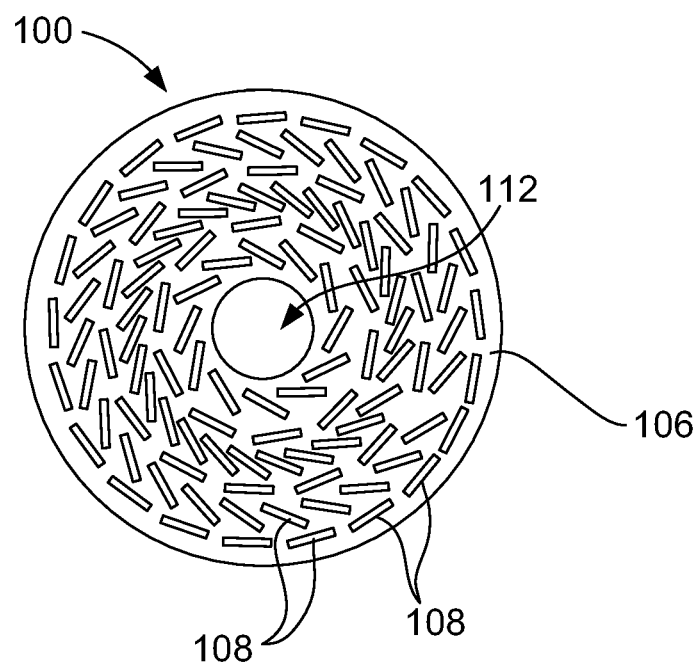
FIG. 1 is a front view of an example metalens according to some embodiments.

FIG. 1 is a front view of an example metalens 100. The metalens 100 comprises a substrate 106 with an array of subwavelength structures 108 distributed thereon. The subwavelength structures 108 are arranged on the substrate in a pattern to interact with visible light. The subwavelength structures 108 in this example are nanofins (e.g. thin rectangular-prism-shaped extensions).

As will be apparent to a person skilled in the art, the size and number of the subwavelength structures 108 are not shown to scale. The subwavelength structures 108 as shown in FIG. 1 are substantially enlarged and reduced in number for illustrative purposes. For example, the diameter of the metalens 100 shown in FIG. 1 may be a few centimeters (although metalenses used in eyewear according to the disclosure are not limited to a particular size) and subwavelength structures 108 may have dimensions in the range of 10's to 100's of nanometers. Furthermore, a metalens will typically include orders of magnitude more subwavelength structures than are shown in FIG. 1 (possibly on the order of one million nanostructures per square millimeter or more).

The arrangement of subwavelength structures 108 shown in FIG. 1 is also shown to illustrate that the subwavelength structures 108 may be arranged in a pattern with various tilt angles relative to one another. Embodiments of this disclosure are not limited to any particular pattern or arrangement of subwavelength structures of a metalens, including the pattern shown in FIG. 1.

The metalens 100 in FIG. 1 is planar disc-shaped (although the shape may vary in other embodiments. The subwavelength structures 108 are arranged in a pattern that extends radially about a center axis 124 (shown in FIG. 2) of the metalens 100 for an iris-like distribution. The metalens in this example defines a circular center area 112 that does not include the subwavelength structures. The subwavelength structures 108 are not included in the center area 112 in this example because axial and paraxial rays passing therethrough may not require an alteration of the wavefront to focus. The size of the center area may vary. In other embodiments, the center area 112 may be larger or smaller or omitted. In other words, the metalens 100 may alternatively include subwavelength structures 108 in the region occupied by the center area 112 in FIG. 1.

Each subwavelength structure 108 may have height, width and/or thickness in the range of 10s to 100s of nanometers. A nanofin-type subwavelength structure may be generally rectangular prism-shaped. For example, a nanofin sized to have a peak response at the wavelength of green light (532 nm) may be 600 nm high by 250 nm wide by 95 nm thick (although embodiments are not limited to these particular dimensions). The nanofins may, for example, be spaced approximately 600 nm apart. The nanofins (or other subwavelength structures) may be arranged radially about the center axis 124 (FIG. 2) at various tilt angles relative to the radial direction. The separation between the structures 108 may similarly be in the range of nanometers.

The thickness of the metalens 100 may be on the order of microns, depending on the thickness of the substrate 106.

Figure 2:
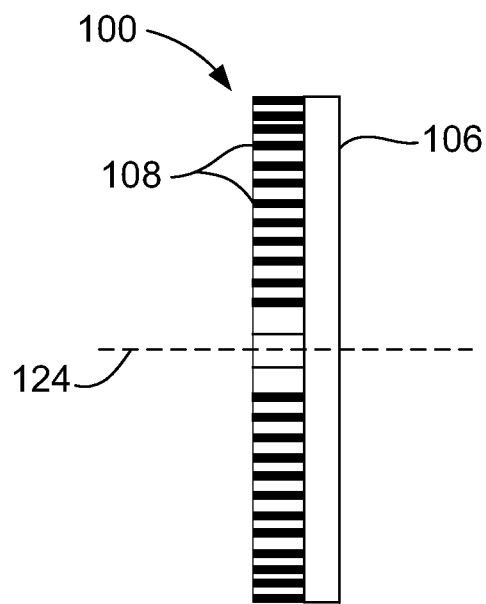
FIG. 2 is a front view of the metalens of FIG. 1.

FIG. 2 is a side view of the metalens 100 of FIG. 1. Again, for illustrative purposes, the subwavelength structures 108 of the metalens 100 are not shown to scale. The substrate 106 in this example is flat, but may have posterior convexity or other curvature in other embodiments.

The center axis 124 is shown in FIG. 2. The metalens 100 extends radially about the center axis.

FIG. 3 is an enlarged perspective partial view of an example array 300 of nanofins 302 of a metalens. The array 300 is only partially shown and extends beyond the stippled line border of FIG. 3. Similar nanofin arrays are shown by M. Khorasaninejad et al. "Super-Dispersive Off-Axis Meta-Lenses for Compact High Resolution Spectroscopy" Nano Lett. 2016, 16, 3732-3737, the entire content of which is incorporated by reference. The nanofins 302 are generally rectangular-prism-shaped extensions from a substrate (not visible). The subwavelength structures 108 of the metalens 100 shown in FIG. 1 may be in a form similar to the nanofins 302 shown in FIG. 3. For example, the array 300 may be representative of a small portion of the metalens 100 in FIGS. 1 and 2. However, embodiments are not limited to the particular arrangement of nanofins shown in FIG. 3. The specific arrangement/pattern of the subwavelength structures may vary and is dependent upon the desired output characteristic (e.g. focus strength) of the lens. Embodiments are not limited to any particular configuration of the subwavelength structures.

The dimensions of the subwavelength structures may allow a metalens to be much thinner than a refractive lens. A metalens may, thus, be referred to as "nano-thin" or "ultrathin".

Some metalenses have been designed to function in the visible spectrum only at a particular wavelength or in a very narrow wavelength range. Some existing metalenses that interact with visible light include metal or dielectric nanostructures. Example metalens structures including TiO2 nanostructures to interact with visible light over a range in the visible spectrum are described by Mohammadreza Khorasaninejad, et al., in "Visible Wavelength Planar Metalenses Based on Titanium Dioxide, IEEE Journal of Selected Topics in Quantum Electronics, Vol. 23, No. 3, May/June 2017, which is incorporated by reference herein in its entirety. Example TiO2-based metalenses are also described by Byrnes et al. in U.S. Patent Application Publication No. 2017/082263, which is incorporated by reference herein in its entirety.

The metalenses described herein may be configured to interact with visible light having wavelength in the range of 380 to 660 nm. Mohammadreza Khorasaninejad, et al. show results for TiO2 metalenses at wavelengths of 660 nm, 532 nm and 405 nm and state that the operating bandwidth of such metalenses may be expanded by dispersion engineering to a multi-wavelength regime and potentially for a continuous wavelength range. See also F. Aieta, M. A. Kats, P. Genevet, and F. Capasso, "Multiwavelength Achromatic Metasurfaces by Dispersive Phase Compensation", Science, vol. 347, pp 1342-1345, 2015, which is incorporated herein by reference in its entirety.

TiO2 as the material for subwavelength structures may be beneficial when used in eyewear. TiO2 has been shown to be suitable for metalenses that function over a broad range of the visible light spectrum. TiO2 is also biocompatible and bioinert and has been used in various types of biomedical devices. TiO2 may have negligible optical absorption in the visible spectrum. Other potential benefits of TiO2 include its high index of refraction (close to diamond), high melting point, and antimicrobial properties. See for example, Joseph A. Lemire et al. "Anti microbial Activity of Metals: Mechanisms, Molecular Targets and Applications" Nature Reviews Microbiology, Vol. II, No. 6, pages 371-384; Jun. 13, 2013, the entirety of which is incorporated by reference. TiO2, when deposited, may be strongly adherent to the substrate and chemically impermeable. However, embodiments are not limited to TiO2 subwavelength structures. Some additional dielectric materials that may be used for subwavelength structures include, but are not limited to, quartz, Gallium Nitride (GaN), and silicon nitride. Other materials such as metal may be suitable for subwavelength structures in the eyewear lenses.

TiO2 also has a high index of refraction (approximately 2.37 for 550 nm wavelength light), and metalenses using this dielectric may have high conversion efficiency. The term "conversion efficiency" herein refers to the amount of visible light entering the system when compared to the amount in the final focal point. Losses may occur from reflection, scattering, absorption, diffraction, etc. Mohammadreza Khorasaninejad, et al. referenced above disclose up to 86% actualized and 95% simulated conversion efficiency for TiO2 metalenses. Such metalenses may also have a high numerical aperture (NA) (e.g. NA=0.8) and may be capable of focusing light into diffraction limited spots 1.5× smaller than commercial 100× objective lenses, such as the Nikon™ CFI 60. Furthermore, TiO2 may be deposited on certain materials, atomic layer by layer by existing chip manufacturing technology.

The substrate of the metalens in embodiments described herein may be any suitable substantially light-transmissive or transparent material. Some specific examples of substrate material include, but are not limited to, substantially transparent polymer such as silicone, acrylic, High Refractive Index Polymer (HRIP) nano-composite material, and glass. The HRIP may be an organic matrix with high refractive inorganic nanoparticles combined to create a substrate. In some embodiments, the substrate may have a chromophore or coating to filter ultraviolet (UV) light to protect the eye from UV exposure.

The substrate may be substantially rigid in some embodiments. In other embodiments, the substrate may be a flexible, bendable material (e.g. silicone, acrylic, or a hydrogel).

The term "substantially transparent" as used herein does not require absolute transparency. Rather, for example, a tinted material may be considered substantially transparent in that it is suitable for use in eyewear, spectacles, etc.

Figure 4:
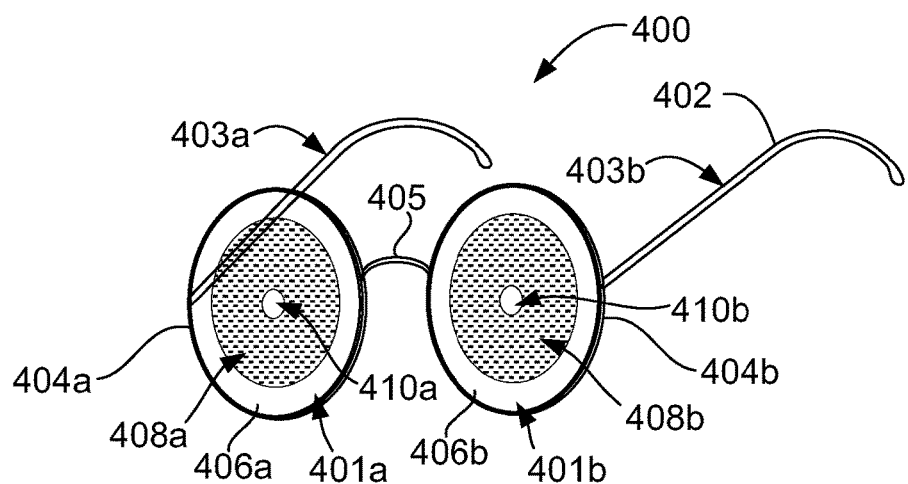
FIG. 4 is a front perspective view of an example eyewear device according to some embodiments.

An example of an eyewear device according to an aspect of the disclosure will now be described with reference to FIG. 4. FIG. 4 is a front perspective view of a pair of spectacles 400 according to one embodiment. However, eyewear embodiments are not limited to the example spectacles in FIG. 4.

The spectacles 400 include a first eyewear lens 401a, a second eyewear lens 401b, and a frame 402. The eyewear lenses 401a and 401b are held in the frame 402 in a manner similar to conventional spectacles.

The example frame 402 has a structure similar to conventional frames and includes temple/earpiece portions 403a and 403b connected by hinge means (not shown) to rims 404a and 404b. The rims 404a and 404b are connected by bridge 405 of the frame 402. The lenses 401a and 401b are secured in the rims 404a and 404b. The frame 402 is configured such that, when worn, the lenses 401a and 401b are positioned in front of the user's eyes to be in their line of sight.

It is to be appreciated that eyewear in other embodiments will have different frame and lens configurations, and the spectacles 400 in FIG. 4 are shown by way of non-limiting example. The shape, size and configuration of eyewear frames and lenses may vary, while still positioning the lenses in the line of sight.

The first eyewear lens 401a includes a lens body 406a and a metalens 408a integrated with the lens body 406a. The second eyewear lens 401b similarly includes a second lens body 406b and second metalens 408b integrated with the second lens body. In this example, the second eyewear lens 401b has the same structure as the first eyewear lens 401a. However, in other embodiments, each eyewear lens may have different structures and/or configurations.

In FIG. 4, stippled shading is used to illustrate the general position and layout of the metalenses 408a and 408b and is not meant to represent a reduction in light transmittivity. The metalenses 408a and 408b may be highly light transmissive and may be substantially transparent. The size of the metalenses 408a and 408b may vary. For example, the metalenses 408a and 408b may cover a smaller or larger area than shown or may occupy substantially the same area as the lens bodies 406a and 406b.

In this embodiment, the lens bodies 406a and 406b are flat circular disc-shaped bodies. More particularly, the lens bodies 406a and 406b in this example are each a pane or plate of light transmissive material. The lens bodies 406a are planar in this embodiment, with generally parallel front and rear surfaces separated by relatively small thickness. However, embodiments are not limited to planar configurations. For example, the lens body in other embodiments may have a somewhat curved front and rear surfaces (e.g. convex or concave) in other embodiments. Eyewear lenses described herein are also not limited to circular, disc-like shapes. Other shapes, (e.g. rectangular, oblong, etc.) are also possible.

The term "lens body" herein does not mean that the body itself focuses or otherwise performs traditional corrective lens functions. Rather, these lensing functions are performed by the metalenses 408a and 408b, while the lens bodies 406a and 406b serve to secure the metalenses 408a and 408b and may improve handling of the eyewear lenses 401a and 401b. For example, the lens body 406a may also provide protection for the metalens 408a and/or allow for easier mounting of the eyewear lenses 401a and 401b in the frame 402.

The lens bodies 406a and 406b may be any substantially transparent material suitable for carrying the metalenses 408a and 408b. Example materials for the lens bodies 406a and 406b include, but are not limited to, plastic (e.g. CR39 plastic), polycarbonate, glass and high-refractive-index polymer (HRIP). Traditional spectacles are made of CR39 plastic, polycarbonate or other high index materials. While CR39 plastic is commonly used in conventional eyewear, polycarbonate may be more impact resistant and is commonly used for safety applications. High index lenses may typically be relatively thin, light and have a good appearance compared to lower index materials. Embodiments are not limited to a particular material composition or index value of the lens bodies described herein.

The metalenses 408a and 408b each comprise a distribution of subwavelength structures on a substrate, with the subwavelength structures arranged to interact with visible light. The metalenses 408a and 408b may, for example, have structure and function similar to the subwavelength structures of the metalens 100 in FIGS. 1 and 2. The subwavelength structures of the metalenses 408a and 408b may, for example, be shaped and/or arranged similar to the nanofins 302 shown in FIG. 3, although embodiments are not limited to any particular shape, size or arrangement of the subwavelength structures.

Figures 5, 6, 7:
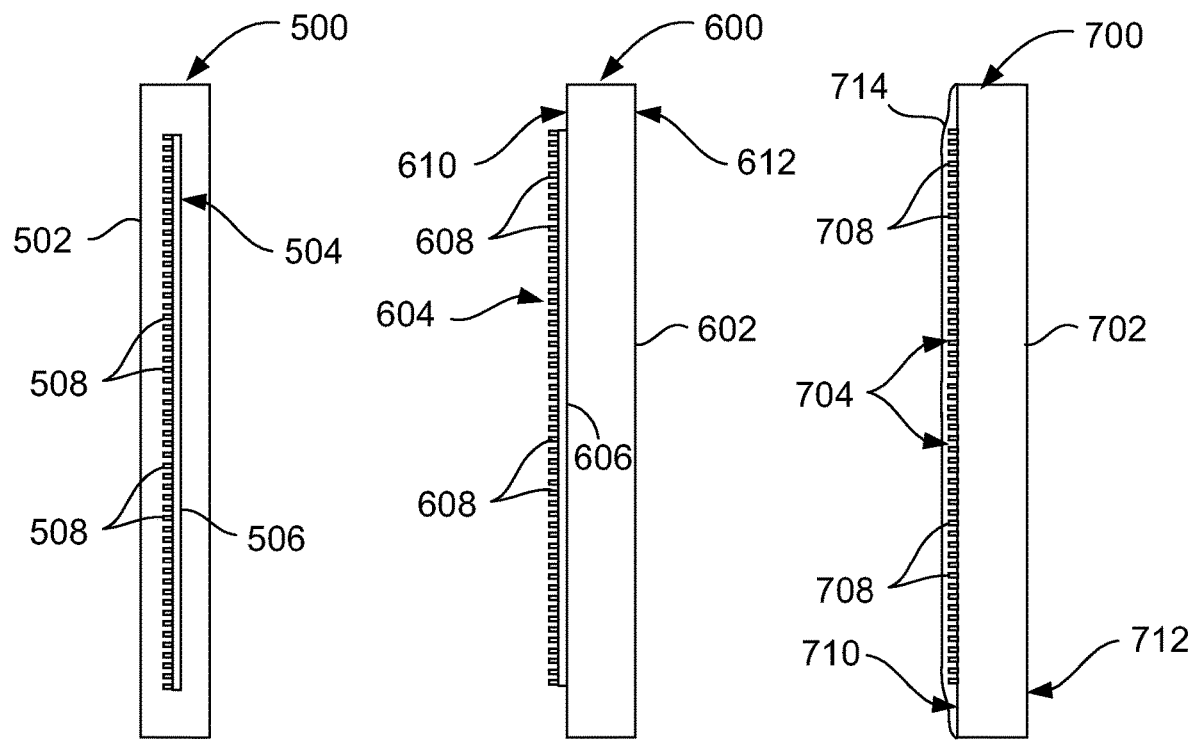
FIG. 5 is a side cross-sectional view of an eyewear lens according to some embodiments.
FIG. 6 is a side cross-sectional view of another eyewear lens according to some embodiments.
FIG. 7 is a side cross-sectional view of yet another eyewear lens according to some embodiments.

The method by which the metalenses 408a and 408b are integrated with the respective lens bodies 406a and 406b may vary. The metalenses 408a and 408b may be attached (e.g. adhered or bonded) to the front or rear surface of the corresponding lens bodies 406a and 406b. Alternatively, the metalenses 408a and 408b may be embedded within the corresponding lens bodies 406a and 406b (e.g. between and substantially parallel to the front and rear surfaces of the lens bodies 406a and 406b). As yet another option, the subwavelength structures of the metalenses 408a and 408b may be deposited directly on the corresponding lens bodies 406a and 406b (with the lens bodies 406a and 406b thereby forming the substrate for the subwavelength structures). Any suitable method for the lens bodies 406a and 406b to hold the metalenses 408a and 408b may be used. Other arrangements are also possible. Some example structures of eyewear lenses showing details of how the metalenses 408a and 408b are integrated with the lens bodies 406a and 406b are shown in FIGS. 5 to 7 and described below.

The metalenses 408a and 408b may be configured to correct an eye condition including, but not limited to, near or far-sightedness and/or vertical or horizontal dysphoria (via prismatic correction). The shape, dimensions, and/or arrangement of the subwavelength structures may be designed based on eyesight tests and computer software (e.g. Lumerical™ simulation software).

The subwavelength structures of the metalenses 408a and 408b may comprise any material suitable for fabricating subwavelength structures to interact with visible light. For example, the subwavelength structures may be a dielectric such as TiO2. However, the subwavelength structures may also be a non-dielectric material such as metal. The subwavelength dielectric structures may be nanopillars arranged to function over a range of wavelengths.

The substrate for the metalens of an eyewear lens may be any substantially light transmissive material capable of having subwavelength structures formed thereon. The substrate may be substantially rigid or flexible. The selection of the particular materials for the eyewear device may be based on optical performance and manufacturing considerations.

Optionally, each lens 401a and 401b includes a center area 410a and 410b that does not include subwavelength structures, similar to the metalens 100 of FIGS. 1 and 2. Central axial and par-axial rays passing through the center areas 410a and 410b may not require interaction by the lenses 401a and 401b.

The eyewear lenses 401a and 401b may have a reduced weight, thickness and/or curvature compared to conventional refractive lenses for spectacles.

The metalenses 408a and 408b may include multiple regions or zones, with each region having a respective distribution of subwavelength structures. The subwavelength structures in one region may have one or more dimensions and/or distribution patterns that differ from one or more other regions. Embodiments are not limited to a particular pattern, dimension, or distribution of the subwavelength structures.

To determine a desired layout of the subwavelength structures of the metalenses described herein, in order to treat an eye condition, eyesight testing or other measurements may be performed. A dioptric strength of the metalens(es) may be calculated based on the testing. Computer software may then be used to determine the dimensions and arrangement of the subwavelength structures based on the requirements obtained as a function of the eye measurement process. One example of suitable software is Lumerical™ simulation software. The software may, for example, define the subwavelength pattern/arrangement to achieve the focal point to the refractive equivalent dioptric strength. This may be equivalent to traditional convex, concave, astigmatic (toric) or multifocal configurations. However, the variable in lens configuration is not curvature (as for refractive lenses) but rather the height, width, tilt and separation of the subwavelength structures to achieve the same focus. A metalens with the particular configuration determined by the Lumerical™ computer simulation software may then be fabricated. Again, it is to be understood that embodiments are not limited to any particular arrangement or pattern of subwavelength structures, or to any method of determining the particular arrangement or pattern.

The lenses 401a and 401b of the spectacles 400 may also include various other features not shown including, but not limited to, ultraviolet (UV) protection, blue filters, antireflection coatings, etc. In some embodiments, the metalens-based eyewear lenses described herein may not have designated front and back surfaces and may be reversible.

Metalenses may be more efficient and have a higher numerical aperture than flat lenses made with diffractive optics because the wavelength scale ring structure of diffractive optics may degrade the phase profile of incident light. The sub-wavelength scale of nanofin phase disrupters of some metalenses have been shown to achieve excellent diffraction limited focus.

Embodiments are not limited to the size, shape, or arrangement of the metalenses 408a and 408b shown in FIG. 4. In some embodiments, one or more eyewear lenses may each comprise a plurality of metalenses regions or zones, with each region or zone having a different light focusing characteristic, similar to bifocal or trifocal refractive lenses.

Example eyewear lenses will now be described with respect to FIGS. 5 to 8. Such eyewear lenses may, for example, be used to correct a variety of eyesight conditions including, but not limited to near-sightedness, far-sightedness, and vertical or horizontal dysphoria (via prismatic correction).

FIG. 5 is a side cross-sectional view of an example eyewear lens 500 according to some embodiments. The eyewear lens 500 may be used in eyewear such as the spectacles 400 shown in FIG. 4. The eyewear lens 500 comprises a planar lens body 502 and a metalens 504. The metalens 504 comprises a substrate 506 and a plurality of subwavelength structures 508 distributed on the substrate 506 in an arrangement to interact with visible light. The lens body 502 may stabilize the subwavelength structures 508 suspended therein.

The thickness of the substrate 506 and the size of the individual subwavelength structures 508 are shown enlarged for illustrative purposes and are not shown to scale. As described above, subwavelength structures in metalenses typically have dimensions on the order of nanometers, and a metalens may have millions of subwavelength structures per square millimeter. Similar structural details in the embodiments of FIGS. 6 and 7 are also shown enlarged and not to scale.

In FIG. 5, the metalens 504 is embedded within the planar lens body 502. The metalens 504 may be fabricated using a process similar to the method of FIG. 9, for example. The metalens 504 may be embedded by a molding process or any other suitable means. The metalens 504 may be embedded to be substantially parallel with the front and/or back surfaces of the planar lens body 502.

FIG. 6 is a side cross-sectional view of another example eyewear lens 600 according to some embodiments. The eyewear lens 600 may be used in eyewear such as the spectacles 400 shown in FIG. 4. The eyewear lens 600 comprises a planar lens body 602 and a metalens 604. The metalens 604 comprises a substrate 606 and a plurality of subwavelength structures 608 distributed on the substrate 606 in an arrangement to interact with visible light. The metalens 604 may be fabricated using a process similar to the method of FIG. 9, for example.

In FIG. 6, the metalens 604 is adhered or otherwise attached to the front surface 610 of the planar lens body 602. By way of example, an adhesive may be applied to either the substrate 606 or the front surface 610 in order to attach the metalens 604 to the planar lens body 602. In other embodiments, the metalens may be attached to the rear surface 612 of the planar lens body 602.

In some embodiments, the metalens 604 may be removable/replaceable. Thus, the same lens body 602 may be customized for various eye conditions by the desired type of metalens 604 attached thereto.

FIG. 7 is a side cross-sectional view of yet another example eyewear lens 700 according to some embodiments. The eyewear lens 700 may be used in eyewear such as the spectacles 400 shown in FIG. 4. The eyewear lens 700 comprises a planar lens body 702 and a metalens 704. In this example, the planar lens body 702 is the substrate for the metalens 704. A plurality of subwavelength structures 708 are distributed directly on the front surface 710 (or alternately the rear surface 712) of the planar lens body 702 in an arrangement to interact with visible light. The metalens 704 may be fabricated on the planar lens body 702 using a process similar to the method of FIG. 9, for example.

In FIG. 7, the eyewear lens 700 also includes an optional substantially transparent protective layer or coating 714 over the subwavelength structures. The particular type of protective layer or coating 714 may be chosen to minimally interfere with the focusing of the metalens 704. The metalens 704 may be designed to account for the protective layer or coating 714. A similar coating may be included on other lenses described herein, including the lenses 500 and 600 of FIGS. 5 and 6. The eyewear lenses described herein may also comprise other types of coatings including, but not limited to, anti-reflective, polarizing, impact resistance, tint, UV protection, etc.

Figure 8:
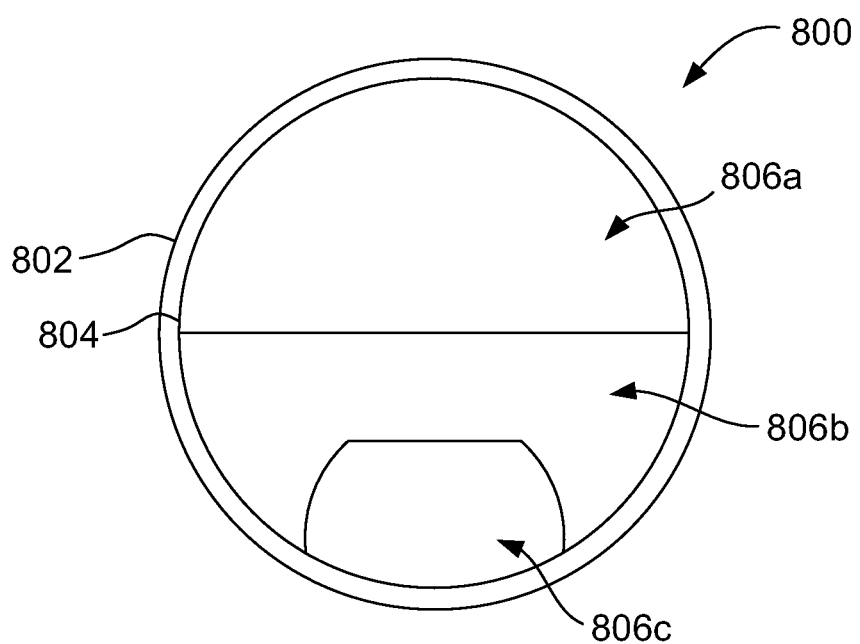
FIG. 8 is a front view of an eyewear lens having multiple metalens regions according to some embodiments.

FIG. 8 is a front view of a multi-focal eyewear lens 800 according to another embodiment. The eyewear lens 800 comprises a lens body 802 and a metalens 804 integrated therewith. The metalens 804 may, for example, be integrated with the body in a manner similar to any of the lenses 500, 600 and 700 shown in FIGS. 5 to 7. The metalens 804 comprises a plurality of regions, namely a first region 806a, a second region 806b and a third region 806c. The first region 806a has a first focal strength. The second region 806b has a second focal strength. The third region 806c has a third focal strength. The subwavelength structures in each region have a configuration for the corresponding focal strength. Similar to a traditional tri-focal lens, the first region 806a may be a "distance" region, the second region 806b may be an "intermediate" region, and the third region 806c may be a "near" region, although embodiments are not limited to this arrangement The first, second and third metalens regions 806a, 806b and 806c may have discrete boundaries or lines of demarcation therebetween. Alternatively, the focal strength of the metalens 804 may have a "progressive" configuration where the focal strength changes over a gradient between the regions.

The first, second and third metalens regions 806a, 806b and 806c are shown having different sizes, although they may have the same size in other embodiments. The number of metalens regions or zones per eyewear lens may also vary. In some embodiments, an eyewear lens may include two or more than three different metalens regions, each having different optical characteristics. The size, position and optical characteristics of each metalens region in a multi-region eyewear lens may vary.

In the example of FIG. 8, the three regions 806a, 806b and 806c are formed as a single metalens sharing a single substrate. In other embodiments, each different focal region of an eyewear lens may be formed as a separate metalens on a separate substrate.

In still other embodiments, an eyewear lens may comprise a metalens that has a variable optical characteristic. For example, rather than multiple portions with discrete focusing strengths, a single metalens may have a gradient from one focusing strength to another over its surface area. For example, the lens may have a first area with a lower focusing power and then increase focusing power over a gradient into a "reading zone" area of the lens. In such cases, there may be no discrete lines of demarcation between the reading zone and the remainder of the metalens. The term "reading zone" herein refers to an area of the lens through which a user is expected to look when reading or performing other activities involving looking at objects relatively near to the eyes.

The eyewear lenses described herein, such as lenses 500, 600, 700 and 800 of FIGS. 5 to 8, are not limited to use in spectacles. Other forms of eyewear devices that may include similar metalens-based lenses include, but are not limited to, swimming goggles, scuba masks, etc. In addition to the typical function of such eyewear (goggles, masks etc.), the metalenses of the eyewear lenses may be configured to correct one or more eye conditions without requiring separate spectacles or contact lenses during use.

In some embodiments, technology similar to existing silicon chip manufacturing processes may be used or adapted for creating a metalens for an eyewear lens. An example electron beam lithography (EBL) process for fabricating a metalens is described by Mohammadreza Khorasaninejad, et al. (2017), which is incorporated herein by reference.

Figure 9:
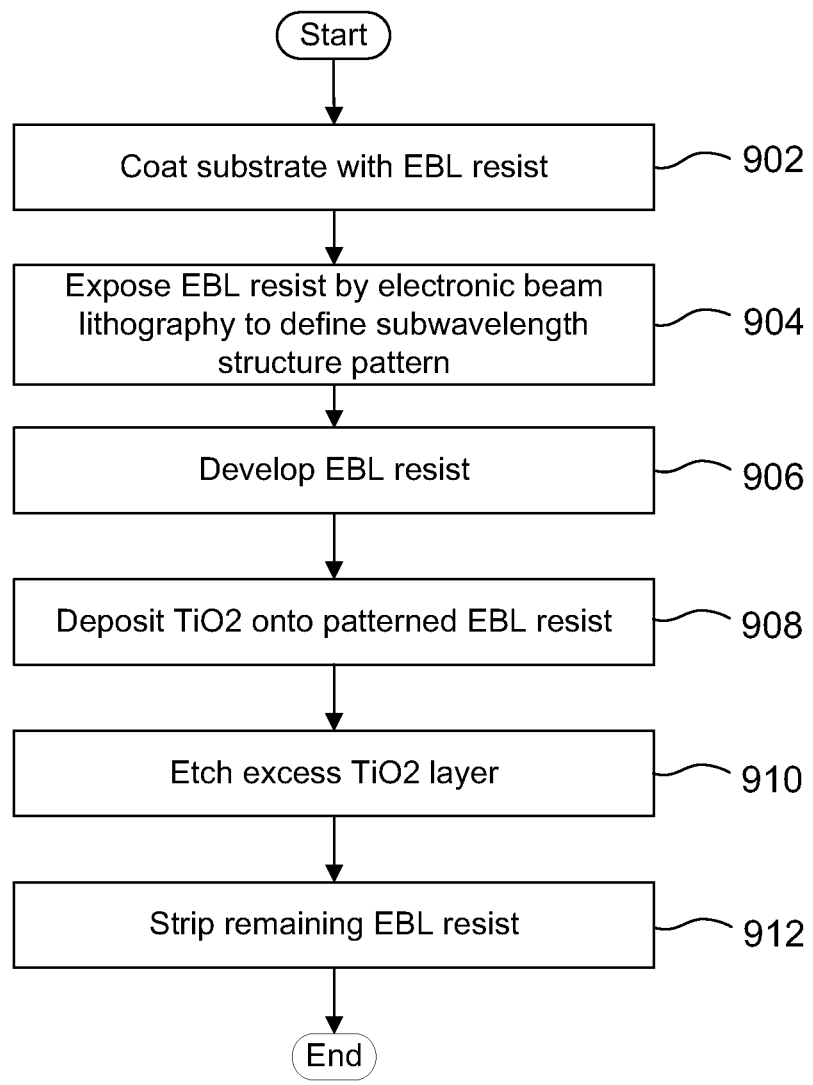
FIG. 9 is a flowchart of a method for making a metalens for an eyewear device using an electron beam lithography (EBL) process according to some embodiments.

FIG. 9 is a flowchart of a method for making a metalens for eyewear using an EBL process according to some embodiments. Embodiments are not limited to the particular EBL process described below. The metalens may also be fabricated using a non-EBL process (e.g. UV lithography) in other embodiments.

At block 902, a polymer substrate is coated with a layer of resist. The resist may, for example, be spin-coated on the substrate. The resist in this example is an EBL resist such as ZEP 520A resist. The thickness of the resist layer may determine the height of the nanostructures to be formed.

At block 904, the resist is exposed by EBL, defining the pattern of the nanostructures in the resist. Alternatively, deep ultraviolet (UV) lithography may be used to pattern the resist. The pattern for the lithography step may generated using commercially available software (e.g. from Lumerical Inc.™).

At block 906, the resist is developed in o-xylene (e.g. 99% o-xylene). This step removes resist according to the lithographed pattern and leave holes or gaps that correspond to the geometry of the intended nanostructures. The remaining resist on the substrate at this stage may be referred to as "patterned" resist.

At block 908, TiO2 is deposited onto the patterned resist. The deposition may be performed by atomic layer deposition (ALD). The TiO2 atomic layer deposition fills the gaps within the patterned resist to form subwavelength structures of the desired shape, diameter, height, tilt and spacing. These subwavelength structures or short wavelength structures (SWS) may be customized to correct eye conditions, such as spherical and chromatic aberration. By way of example, simulations with Lumerical Inc.'s™ FDTD (finite difference time domain) solver programs may be used to create phase profiles for spherical, cylindrical or multifocal platforms, which may reduce or avoid the need to produce costly prototypes before manufacture.

The deposition of TiO2 may result in an excess TiO2 layer on top of the resist. Thus, optionally, at block 610, the excess layer of TiO2 over the resist is etched away.

At block 912, the remaining resist is stripped. For example, the stripping may be performed using an overnight Remover-PG bath. The remaining TiO2 structures on the substrate form the metalens, which may achieve a refractive outcome that is equivalent or better than a conventional lens.

It is to be understood that the method of FIG. 9 is provided by way of example, and embodiments are not limited to this particular method of making a metalens.

Figure 10:
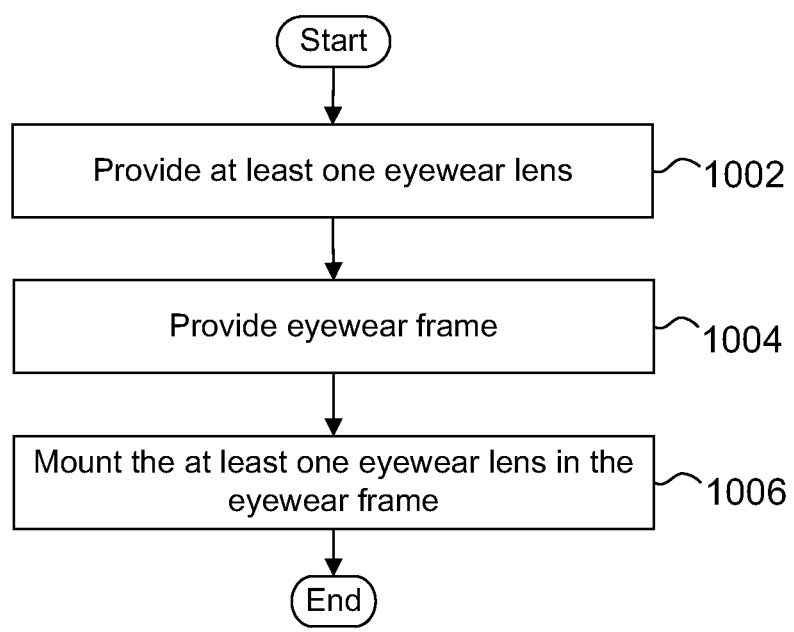
FIG. 10 is a flowchart of a method for making eyewear according to some embodiments.

FIG. 10 is a flowchart of an example method for making eyewear according to another aspect.

At block 1002, at least one eyewear lens is provided. The at least one eye wear lens may be similar to any of the eyewear lenses 401a, 401b, 500, 600, 700 and 800 described above and shown in FIGS. 4 to 8. More particularly, the eye wear lens includes a substantially transparent and generally planar lens body and a metalens integrated with the body. The metalens comprises a substantially transparent substrate and a plurality of subwavelength structures arranged on the substrate in a pattern to interact with visible light. Providing the eyewear lens may comprise making, purchasing or otherwise obtaining the eyewear lens.

In some embodiments, making the lens comprises integrating a metalens with a lens body. Integrating the metalens and the lens body may comprise attaching the metalens to a front or rear surface of the lens body. In other embodiments, making the lens comprises embedding the at least one metalens within the lens body (e.g. by a molding process). In still other embodiments, making the lens comprises depositing the subwavelength structures of at least one metalens directly on the lens body.

At block 1004, an eyewear frame is provided. The frame may be similar to the eyewear frame 402 shown in FIG. 4, for example, although embodiments are not limited to any particular eyewear frame. Any eyewear frame suitable for mounting one or more eyewear lenses and being worn by a user may be used. Providing the eyewear frame may comprise making, purchasing or otherwise obtaining the eyewear frame.

At block 1006, the at least one eyewear lens is mounted in the eyewear frame. The at least one eyewear lens may be mounted using any suitable method (adhesive, gripping means, friction mounting, etc.). What has been described is merely illustrative of the application of the principles of the disclosure. Other arrangements and methods can be implemented by those skilled in the art without departing from the scope of the present disclosure.

Figure 11:
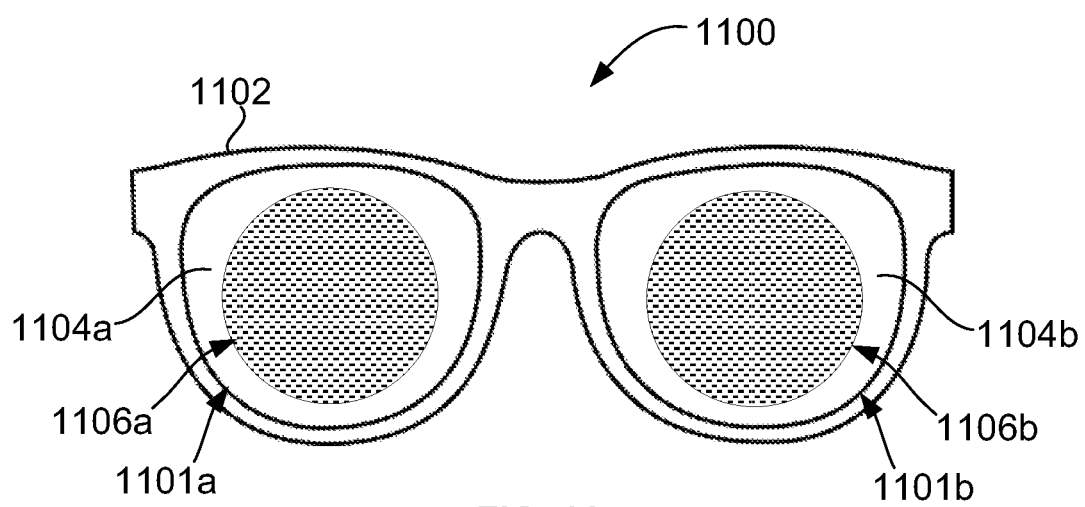
FIG. 11 is a front view of an example eyewear device according to another embodiment.

FIG. 11 is a front view of an example eyewear device 1100 (spectacles in this case) according to another embodiment. The eyewear device 1100 includes a frame 1102 and first and second eyewear lenses 1101a and 1101b held by the frame 1105. Temple and ear pieces of the frame 1102 are not shown. Each of the eyewear lenses 1101a and 1101b comprises a respective lens body 1104a or 1104b, and a respective metalens 1106a or 1106b integrated with the corresponding lens body 1104a or 1104b. Again, stippled shading is used only to illustrate the general position and layout of the metalenses 1106a and 1106b. The eyewear lenses 1101a and 1101b and rims of the frame 1102 are not circular in this embodiment, but have a non-circular shape similar to some typical conventional spectacles. The eyewear lenses 1101a and 1101b may be planar.

What has been described is merely illustrative of the application of the principles of the disclosure. Other arrangements and methods can be implemented by those skilled in the art without departing from the scope of the present disclosure.

The invention claimed is:

1. An eyewear device comprising:
an eyewear frame wearable by a user;
at least one eyewear lens held by the eyewear frame, each at least one eyewear lens comprising: a respective substantially transparent lens body; and a respective metalens integrated with the lens body, wherein the metalens comprises a substantially transparent and rigid substrate and a plurality of subwavelength structures arranged on the substrate in a pattern to interact with visible light, wherein the metalens of each said at least one eyewear lens is configured to correct an eyesight condition.

2. The eyewear device of claim 1, wherein the eyewear device comprises spectacles.

3. The eyewear device of claim 1, wherein the subwavelength structures comprise one of a dielectric material and a metal.

4. The eyewear device of claim 1, wherein, for each said eyewear lens, the respective lens body comprises one of: plastic, polycarbonate, high-refractive-index polymer, and glass.

5. The eyewear device of claim 1, wherein the subwavelength structures comprise nanopillars.

6. The eyewear device of claim 1, wherein, for each said eyewear lens, the respective metalens is embedded within the lens body.

7. The eyewear device of claim 1, wherein, for each said eyewear lens, the respective lens body comprises a front and a rear surface, and the metalens is arranged on one of: the front surface and the rear surface.

8. The eyewear device of claim 7, wherein, for each said eyewear lens, the respective substrate of the metalens is adhered to the lens body.

9. The eyewear device of claim 1, wherein the substrate comprises one of: a polymer and glass.

10. The eyewear device of claim 1, wherein, for each said eyewear lens:
the respective lens body comprises a front and a rear surface;
the substrate comprises one of the front surface and the rear surface of the lens body.

11. The eyewear device of claim 1, wherein the lens body is a planar body.

12. The eyewear device of claim 1, wherein, for each said at least one eyewear lens, the respective metalens comprises a plurality of metalens regions, each of the plurality of metalens regions having a respective focusing strength.

13. An eyewear lens for use in a frame wearable by a user, the eyewear lens comprising:
a substantially transparent lens body; and
a metalens integrated with the lens body, wherein the metalens comprises a substantially transparent and rigid substrate and a plurality of subwavelength structures arranged on the substrate in a pattern to interact with visible light, wherein the metalens is configured to correct an eyesight condition.

14. The eyewear lens of claim 13, wherein the eyewear lens is for spectacles.

15. The eyewear lens of claim 13, wherein the subwavelength structures comprise nanopillars.

16. The eyewear lens of claim 13, wherein the metalens is embedded within the lens body.

17. The eyewear lens of claim 13, wherein the lens body comprises a front and a rear surface, and the metalens is arranged on one of: the front surface and the rear surface.

18. The eyewear lens of claim 17, wherein the substrate of the metalens is adhered to the lens body.

19. The eyewear lens of claim 13, wherein:
the lens body comprises a front and rear surface; and
the substrate comprises one of the front surface and the rear surface of the lens body.

20. The eyewear lens of claim 13, wherein the metalens comprises a plurality of metalens regions, each of the plurality of metalens regions having a respective focusing strength.

21. An eyewear lens for use in a frame wearable by a user, the eyewear lens comprising:
a substantially transparent lens body; and
a metalens integrated with the lens body, wherein the metalens comprises a substantially transparent and rigid substrate and a plurality of subwavelength structures arranged on the substrate in a pattern to interact with visible light, wherein the metalens comprises a plurality of metalens regions, each of the plurality of metalens regions having a respective focusing strength.

22. The eyewear lens of claim 21, wherein the subwavelength structures comprise nanopillars.

23. The eyewear lens of claim 21, wherein the metalens is embedded within the lens body.

24. The eyewear lens of claim 21, wherein the substrate of the metalens is adhered to the lens body.

* * * * *